United States Patent
Jakobsson

(10) Patent No.: US 11,477,209 B2
(45) Date of Patent: Oct. 18, 2022

(54) MANAGING ACCESS RIGHTS OF TRANSFERABLE SENSOR SYSTEMS

(71) Applicant: Amber Semiconductor, inc., Dublin, CA (US)

(72) Inventor: Bjorn Markus Jakobsson, Portola Valley, CA (US)

(73) Assignee: Amber Semiconductor, Inc., Dublin, CA (US)

(*) Notice: Subject to any disclaimer, the term of this patent is extended or adjusted under 35 U.S.C. 154(b) by 242 days.

(21) Appl. No.: 16/527,826

(22) Filed: Jul. 31, 2019

(65) Prior Publication Data

US 2020/0053100 A1   Feb. 13, 2020

Related U.S. Application Data

(60) Provisional application No. 62/716,081, filed on Aug. 8, 2018.

(51) Int. Cl.
  *H04L 9/40* (2022.01)
  *H04L 67/125* (2022.01)
  *H04W 12/63* (2021.01)

(52) U.S. Cl.
  CPC .......... *H04L 63/108* (2013.01); *H04L 67/125* (2013.01); *H04W 12/63* (2021.01)

(58) Field of Classification Search
  CPC ... H04L 63/108; H04L 67/125; H04L 63/102; H04W 4/33; H04W 4/80; H04W 4/021; H04W 12/08; H04W 12/63
  See application file for complete search history.

(56) References Cited

U.S. PATENT DOCUMENTS 7,610,616 B2   10/2009  Masuouka et al.
9,990,786 B1*   6/2018  Ziraknejad ............. G06F 21/45
(Continued)

OTHER PUBLICATIONS

A. Juels et al., "Cache Cookies for Browser Authentication," 2006 IEEE Symposium on Security and Privacy, May 21-24, 2006, 15 pages.

(Continued)

*Primary Examiner* — Nicholas R Taylor
*Assistant Examiner* — Sanjoy K Roy
(74) *Attorney, Agent, or Firm* — Ryan, Mason & Lewis, LLP

(57) ABSTRACT

An apparatus comprises at least one processing device comprising a processor coupled to a memory. The processing device is configured to receive from a requester a request to modify a parameter of an access-controlled account associated with a set of sensor devices. Responsive to receipt of the request, the processing device initiates at least one instance of a proof of physical presence protocol, the proof of physical presence protocol requiring performance by the requester of at least one action involving at least one sensor device of the set of sensor devices associated with the access-controlled account. Responsive to successful completion of at least one instance of the proof of physical presence protocol, the processing device sends at least one notification to each of one or more registered users of the access-controlled account. The processing device approves or rejects the request based at least in part on at least one of a number and a type of responses to the one or more notifications.

20 Claims, 4 Drawing Sheets

(56) References Cited

U.S. PATENT DOCUMENTS

| | | | |
|---|---|---|---|
| 2007/0143826 A1 | 6/2007 | Sastry et al. | |
| 2009/0203355 A1 | 8/2009 | Clark | |
| 2010/0235896 A1* | 9/2010 | Hirsch | G06F 21/629 |
| | | | 726/7 |
| 2010/0309003 A1* | 12/2010 | Rousseau | G07C 1/10 |
| | | | 340/573.4 |
| 2013/0104238 A1* | 4/2013 | Balsan | G06Q 30/0207 |
| | | | 726/26 |
| 2013/0300534 A1 | 11/2013 | Myllymaki | |
| 2014/0096272 A1 | 4/2014 | Makofsky et al. | |
| 2014/0331278 A1* | 11/2014 | Tkachev | H04L 63/08 |
| | | | 726/1 |
| 2015/0221151 A1* | 8/2015 | Bacco | G07C 9/00571 |
| | | | 340/5.83 |
| 2016/0035159 A1 | 2/2016 | Ganapathy Achari et al. | |
| 2018/0054460 A1* | 2/2018 | Brady | H04L 63/1416 |
| 2018/0174076 A1 | 6/2018 | Fukami | |
| 2019/0036928 A1 | 1/2019 | Meriac et al. | |
| 2019/0068716 A1* | 2/2019 | Lauer | H04W 4/12 |
| 2019/0104138 A1 | 4/2019 | Storms et al. | |

OTHER PUBLICATIONS

P. Verleg, "Cache Cookies: Searching for Hidden Browser Storage," Bachelor Thesis, Radboud University, Jun. 26, 2014, 35 pages.

H. Siadati et al., "Mind Your SMSes: Mitigating Social Engineering in Second Factor Authentication," Computers & Security, vol. 65, Mar. 2017, pp. 14-28.

R. McMillan et al., "Hackers Release Botnet Code, Raising Specter of More Attacks," The Wall Street Jounal, Jul. 8, 2018, 3 pages.

N. Bowles, "Thermostats, Locks and Lights: Digital Tools of Domestic Abuse," The New York Times, Jun. 28, 2018, 6 pages.

S. Brands et al., "Distance-Bounding Protocols," SpringerLink, Extended Abstract, 1993, 6 pages.

Wikipedia Contributors, "Multi-Factor Authentication," Wikipedia, The Free Encyclopedia, Jul. 31, 2019, 9 pages.

EMC Corporation, "RSA SecurID Hardware Tokens Data Sheet," Oct. 2015, 1 page.

Google, "Method: Projects.serviceAccounts.undelete," Cloud Identity and Access Management, Google Cloud, Jul. 31, 2019, 5 pages.

* cited by examiner

MANAGING ACCESS RIGHTS OF TRANSFERABLE SENSOR SYSTEMS

RELATED APPLICATION(S)

The present application claims priority to U.S. Provisional Patent Application Ser. No. 62/716,081, filed Aug. 8, 2018 and entitled "Managing Access Rights of Transferable Sensor Systems," which is incorporated by reference herein in its entirety.

BACKGROUND

Home and office automation technologies offer great opportunities to reduce energy costs, improve physical security, and improve end-user convenience, and are experiencing tremendous growth as a result of the benefits they provide their users. These systems are almost always networked, as it is both natural and beneficial to connect local systems to centralized points that collect and analyze data, enable a feedback loop to automatically manage the environment, and permit remote control of local systems.

However, as homes and offices are increasingly automated, including equipped with sensors and made remotely accessible, new forms of security and privacy needs are pushed to the forefront. As the systems are becoming common, the reports of abuses are also increasing in frequency and prominence, whether the abuses are carried out by faceless hackers on the Internet or angry ex-spouses. Illustrative media coverage includes the Jul. 8, 2018 Wall Street Journal article "Hackers Release Botnet Code, Raising Specter of More Attacks" and the Jun. 23, 2018 New York Times article "Thermostats, Locks and Lights: Digital Tools of Domestic Abuse."

These sensor systems are commonly installed and configured by a person other than the eventual user. For example, the sensor systems may be owned and managed by a landlord, but used by a tenant. Commonly, the users change over time, as users move from one home or office to another. Some of these moves create adversarial relationships, such as when an ex-spouse moves out or a disgruntled employee leaves. It is critical that only the rightful users have access rights to some types of information, such as personal information, and that only such users have the capabilities to remotely control the system. Moreover, systems like these must be secure against hackers; against users with temporary access to an area (such as a cleaner or a guest); and against unwanted parties with knowledge of personal details of rightful users, where such details might be used to manage access control.

SUMMARY

Illustrative embodiments provide techniques for managing access rights of transferable sensor systems. A "transferable sensor system" as that term is broadly used herein is intended to encompass a sensor system, such as a home or office sensor system, for which access rights may be transferred from one user to another over the course of time, as in the case of the tenants of a house or apartment changing over time, or the employees of an office facility changing over time. The illustrative embodiments advantageously provide enhanced security in these and a wide variety of other situations involving transferable sensor systems, as well as in numerous other contexts involving sensor systems.

In an illustrative embodiment, an apparatus comprises at least one processing device comprising a processor coupled to a memory. The processing device is configured to receive from a requester a request to modify a parameter of an access-controlled account associated with a set of sensor devices. Responsive to receipt of the request, the processing device initiates at least one instance of a proof of physical presence protocol, the proof of physical presence protocol requiring performance by the requester of at least one action involving at least one sensor device of the set of sensor devices associated with the access-controlled account. Responsive to successful completion of at least one instance of the proof of physical presence protocol, the processing device sends at least one notification to each of one or more registered users of the access-controlled account. The processing device approves or rejects the request based at least in part on at least one of a number and a type of responses to the one or more notifications.

For example, in some embodiments, initiating at least one instance of a proof of physical presence protocol comprises initiating respective instances of the proof of physical presence protocol in each of a plurality of iterations, wherein the one or more notifications are sent responsive to successful completion of the proof of physical presence protocol in each of the iterations.

Also by way of example, approving or rejecting the request based at least in part on at least one of a number and a type of responses to the one or more notifications comprises aggregating numbers of responses for each of a plurality of different response types over multiple iterations, wherein for each of the multiple iterations a corresponding one of the instances of the proof of physical presence protocol is initiated and if successfully completed the one or more notifications are sent, and approving or rejecting the request based at least in part on the aggregated numbers of responses.

These and other illustrative embodiments include but are not limited to systems, methods, apparatus, and computer program products. Some of the illustrative embodiments are advantageously configured to address and solve one or more of the above-noted problems of conventional approaches.

DETAILED DESCRIPTION

Figure 1:
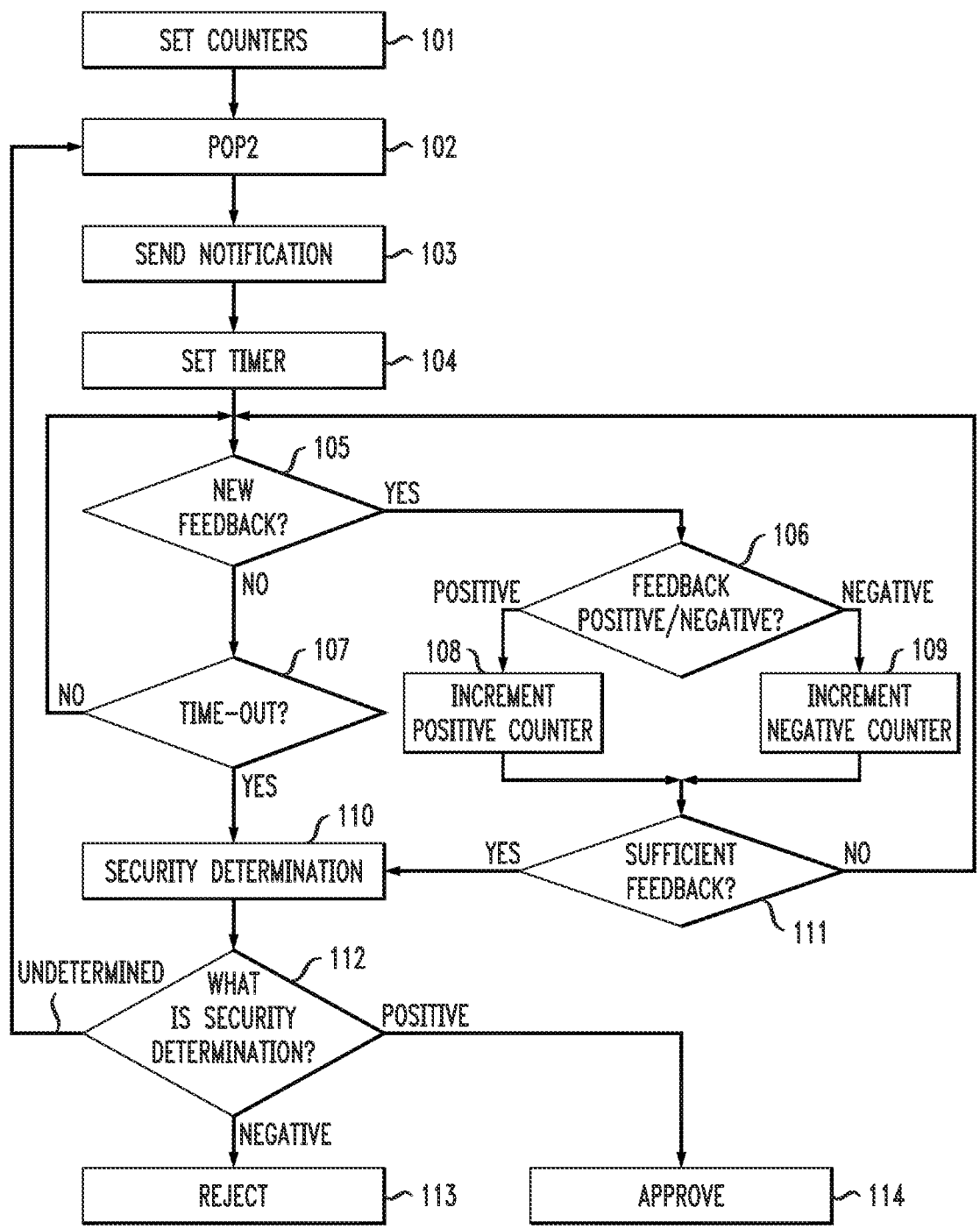
FIGS. 1, 2 and 3 are flow diagrams of example access rights management processes using proofs of physical presence in illustrative embodiments.

Illustrative embodiments will be described herein with reference to exemplary information processing systems and associated computers, servers, storage devices and other processing devices. It is to be appreciated that the embodiments described below are presented by way of example only, and should not be construed as limiting in any way.

Traditional account management solutions do not address the problems described above. For example, access to email accounts is commonly controlled using passwords, with a fallback to security questions; however, people living together commonly share passwords, and commonly know the personal facts underlying each other's security questions. To make it more complicated, these users have previously been legitimate system users, but as they move, may become unwanted parties. In a company, account access is controlled by an administrator ("admin") who is understood to be trusted, but in these and other situations, the party who configured the system may not remain a legitimate user. Therefore, in situations involving asymmetric technology skills, it should be possible for the control, whether access to data or capabilities, to be obtained and retained by a non-technical person, in light of potentially adversarial behavior by a more technically skilled "insider" user who potentially knows personal information about the legitimate user and may have reasons to interfere with him or her. In addition, an attacker such as a malicious insider may attempt to perform what is referred to as a Sybil attack, in which he or she generates multiple personas with the goal of overwhelming the good users.

The situation is complicated by the fact that if a tenant with legitimate control moves, it must still be possible for a landlord, without the active collaboration of the tenant, to retain control of the premises, and then, to hand over control to a new tenant. However, it is not acceptable for the same landlord to maintain constant access to the system, at least not in terms of access to potentially personal and sensitive data derived by the sensor systems.

These needs must be balanced with needs to legitimately access the system, whether for a legitimate user who has access credentials; a legitimate user who has lost or forgotten the access credentials; or a legitimate user in conflict with a party with knowledge, control or partial access to the physical and logical system.

Although there are existing technologies that address the slightly related problem of allowing users to prove that they have the right to a financial resource, these technologies do not address the described problems. For example, to set up an account with an organization that offers to transfer money in and out of end-user bank accounts, a user has to prove to the organization that he or she has the ability to access the bank account, e.g., by reporting on the sizes of one or more deposits into the account, where the sizes are selected in a manner that is not predictable to users. An analogous approach modified to control access to a system of sensors instead of a bank account would not solve the problem, as a user with temporary access would be able to establish access rights, thereby exposing data and control capabilities to contractors installing the system, guests, cleaning staff, landlords, and more, but without restricting access and control of previously legitimate users who are no longer wanted users. Just like forcing a user to prove access to a bank account for each requested third-party transaction is not practically meaningful solution to the problem of proving access to a financial account, neither is an analogous version in which a home owner or tenant is forced to prove access abilities before being able to turn on or off lights, monitor a security camera, or change the settings of a thermostat. It is, moreover, an entirely meaningless approach in the context of enabling remote control of a home or enterprise system, as the user, by definition, is remote to the system, even if just temporarily.

Traditional access control methods, whether for consumer use or enterprise use, do not adequately address these and other significant problems described herein. However, as the home automation market is rapidly growing, there is a ballooning need to address problems related to access. In the absence of well-designed solutions, these systems will result either in the massive loss of sensitive personal information; a severe, albeit voluntary, stunting of their capabilities and impact; or both. The techniques disclosed herein address these important emerging problems involving security, privacy and practical usability. For example, illustrative embodiments address both access control and access right control.

Access control is the notion of determining what types of resources a registered user should be allowed to access, and to block access to such resources from non-registered users. A wide variety of access control techniques are known in the art.

Access right control, in contrast, is the notion of determining who should have the rights to be a registered user. It also addresses what type of access rights a user should be given, which later impacts what types of resources that access control technologies allow the user to use. As indicated above, conventional approaches fail to adequately address the problem of access right control for physical systems such as distributed sensor networks for which access control is not static, but needs to be modified over time. An example of such a system is a home automation system, and a related example is a system used for control of enterprise environments. The absence of a solution to address access right control for such system is a great liability for any organization or end user interested in the use of sensor networks of these types, as the absence opens the users up for abuse. The present disclosure addresses these and other important problems of conventional practice.

Security in some embodiments can be viewed as "guaranteed compliance with goals relating to system control" and as such, it is an overarching goal that dove-tails with both privacy and access control. For example, security in some embodiments relates to understanding everything that could go wrong, whether due to malicious action or user error. A secure design, therefore, is one that is created with an understanding of the system in its entirety, including human error and gullibility, while being informed both about general attack approaches and more specific attack vectors.

Illustrative embodiments disclosed herein address these and other needs. For example, some embodiments are configured to provide protection against compromise. We define compromise as the corruption of a local system with the goal of extracting sensitive information or of maliciously modifying system functionality. This can involve credential theft (e.g., phishing), malware attacks, or both. The disclosed approach protects against unauthorized access attempts, including phishing attacks and remote hackers attempting to infect the system with malware. The disclosed approach further requires a local and physical action (e.g., by a resident admin or enterprise admin) in order to make configuration changes, including installing or modifying any software or firmware. This significantly reduces the risk of compromise; it prevents traditional phishing attacks and limits the exposure of malware to Trojans (i.e., malware accidentally approved by admins). At the same time, it enables a practical and user-friendly backup authentication in lieu of traditional (and often vulnerable) password reset technology. Moreover, illustrative embodiments provide protection against insiders. An insider is an operator, whether previous or current, that carries out an attack with the goal of extracting sensitive information or of maliciously modifying system functionality. An insider can be associated with a local system, whether an enterprise installation or a residence. An example of the former is a disgruntled employee, while examples of the latter include an ex-spouse as well as an electrician who installed the system and later refused to surrender control.

Illustrative embodiments of the present disclosure include systems that implement Proofs of Physical Presence (PoP2).

A PoP2 in some embodiments is implemented in the form of a method for a user to prove to a system that he or she has physical access to a system, such as a sensor system or any networked system used to surveil or control a residence, an enterprise facility, or other related system. A version of the PoP2 is the PoP3, which is a Proof of Persistent Physical Presence.

This disclosure introduces and describes example embodiments of PoP2 and PoP3 (collectively referred to as PoP, for sake of denotational simplicity). The disclosure also describes contexts and approaches to use PoP technologies, and how to configure and use these to obtain the desired benefits and balance needs for simple access with security and privacy requirements. This is done in the context of a changing user basis, changing dispositions of users, and the threats outlined in the background of the invention.

Illustrative embodiments of the present disclosure can be used to associate logical access with physical access for objects and areas containing objects.

One practical way of approaching the general problem of access to a resource, such as a portal from which information can be accessed and settings can be controlled, is to start with a unique address, such as an email address or a phone number. However, it is also possible to use any other unique identifier for the purposes of identifying the relevant instance of a portal or other resource; one such example is a user-selected unique name, another is an identifier derived from biometric input data. In one preferred embodiment, we focus on the use of a unique identifier that is also an identifier for a communication account. For purposes of concreteness, we focus on an email address, but note that most of the techniques we describe also apply to other types of communication accounts and their identifiers, such as VoIP accounts and phone numbers.

Moreover, sensor networks are illustratively associated with one or more device identifiers, where a device identifier is a string, such as a number or an alphanumeric sequence, that may be unique, but which does not have to be. These device identifiers can either be communicated by the sensor device, such as a power outlet, a smart breaker, or a terminal, using a wireless method, such as WiFi, Bluetooth, Bluetooth Low Energy (BLE) or NFC; or read by a user from an accessible portion of the sensor device, such as at the side of a cover, inside a cover, or on the wiring inside the gangbox. Out of the box, each sensor device may have a separate identifier associated therewith. This identifier may be a machine-readable code, such as a bar code or a QR code, or a human-readable series of characters.

As the initial configuration is made, which is described in greater detail below, a new identifier may be provided to the person performing the configuration. This person would then write down this code on a sticker and place it inside the cover, etc., of the sensor device; alternatively, for wirelessly transmitted codes, the sensor device may receive the new code from the central system. This allows multiple sensor devices to get the same device identifier as one another. However, there are also benefits associated with having independent identifiers, as will be described below, and the change of the device identifier is optional. The information may also be written in a user manual or be made available by a representative of the sensor device company, provided some identifying information, such as the address of the installation. The device identifier may either be static, as the latter examples suggest, or dynamic, as it could be in an example in which the sensor device transmits it over a wireless channel. If dynamic, a practical approach is to use a rolling code, where the code changes over time. An example of a rolling code is the code of a SecurID® token.

A sensor network illustratively comprises a plurality of sensor devices, each having a device identifier independent of that of the other sensor devices on the network, whether static or dynamic. In the case where a device identifier is not unique, additional information is requested by the system to identify the setting. Such information may be provided by a user and can include, for example, an address associated with the installation. It may also be automatically provided by a device used by the user. An example of such information is the GPS coordinates of the device, which is assumed to be co-located with at least one of the sensor devices of the network. Augmenting a non-unique device identifier with information such as the above example information makes the combination unique, and results in a unique device identifier.

To set up a network of sensor devices, these devices are physically installed and logically connected to each other and to an identifier. The latter is performed during an initial system configuration. If a sensor device is later replaced, removed or added to this network, the configuration is modified, whether manually or automatically, where the automated configuration is performed based on the detection of a new sensor device by one or more of the other sensor devices. The initial identifier may comprise, for example, an email address or phone number associated with the owner, landlord, contractor performing the installation, or installation, or another identifier as described above. While these "personal" identifiers have practical benefits, and especially those associated with a communication account, it is also possible not to associate any such identifier with a network, but instead use a unique device identifier as the system identifier.

During the initial configuration, the collection of sensor nodes associated with a sensor network of one installation are preferably associated with an identifier and one or more credentials. Example credentials are passwords, PINs, OAuth access credentials, biometric templates, etc. It is also possible to associate the collection of sensor nodes to a device such as a control panel, which may be dedicated to the purpose of access and control, or which may be an application ("app") running on a smartwatch, phone, tablet, computer or other computing device. Preferably, the collection is associated with at least one communication account, as this permits simple reset capabilities in instances where credentials are lost or forgotten. This can be done using traditional methods, such as sending a reset hyperlink to the registered communication account.

It is practical to associate multiple communication accounts and/or computational devices with apps. For practical purposes, these are individually labeled in the configuration. Example labels include "Alice's primary email address," "Alice's secondary email address," "Bob's email address," "Alice's cell phone number," "Bob's landline phone number," "The app on Alice's cell tablet," "Contractor Cindy's cell phone number," and "Landlord Larry's email address." Each one of these identifiers can be associated with different access rights, including both the read privileges that correspond to being able to access information, and the write privileges that correspond to being able to exhibit or exercise control over the system configuration, including variables such as the thermostat setting for one particular room for one particular time. The access rights also describe who can modify the list of users, as described by the inclusion of identifiers. However, in a preferred embodiment, at least one of the identifiers can be added, deleted or modified by anybody successfully proving physical presence, e.g., using PoP. This will be detailed below.

We will now detail how account access configurations are made. Example account access configurations include but are not limited to adding a first communication account identifier to a configuration associated with a sensor device collection; initiating the resetting of the credentials associated with one account identifier, such as one email address, phone number or other communications account; adding one or more new identifiers, such as a communication account, and associated credential; and removing or modifying the access rights associated with one or more identifiers, such as communication identifiers, associated with the sensor device collection. We will consider these examples in two groups, where the first two example account access configurations are examples of low-risk changes, and the last two example account access configurations are examples of high-risk changes.

To make a low-risk modification, as outlined above, the system requires a unique account identifier. For a reset of an access credential, the system requires either the communication account descriptor (e.g., a phone number or email address) or a unique device identifier. The system then sends one or more reset messages to each one of the registered accounts associated with the identifier, where the user may preferably be asked to identify what communication identifiers to send the reset message to when a device identifier is used to identify the sensor device collection.

Since this is a low-risk request, the system sends a reset message to the indicated communication account. As is traditional, this message may comprise an explanation and a hyperlink leading to a location where the user is allowed to enter a new credential. Optionally, the system may perform a scan of the computational device as this website visit is performed, where the scan is used to identify the device, e.g., using cookies, cache cookies, user agent based agent-based identification, IP address analysis, etc. Another alternative tracking mechanism is cache cookies, described in A. Juels et al., "Cache cookies for browser authentication," 2006, and P. Verleg, "Cache Cookies: searching for hidden browser storage," Bachelor's Thesis, 2014. A person skilled in the art will recognize that there are many related methods to identify devices. This helps build a profile of the user for purposes of risk assessment, and allows blocking of access from devices that have been reported by the user to have been lost or stolen. Optionally, a PoP can be performed and verified before the requested actions are completed. For some types of reset, such as those aided by reset codes used in lieu of passwords, using a PoP strengthens the system against social engineering attacks, such as the attack described by H. Siadati et al., "Mind your SMSes: Mitigating Social Engineering in Second Factor Authentication."

To make a high-risk modification, e.g., to add a new user or user account to the portal, and to configure the type of access rights this user has, a PoP3 has to be performed and verified. A successful completion of a PoP2 does not prove that the user performing the action is legitimate, though; for example, a PoP2 could be completed by a visitor or a contractor. Therefore, for high-risk modifications, the system preferably sends a notification message to each communication account associated with the account, such as each email.

The notification message describes the requested action, as well as optional additional contextual information such as from where the request is being made, using what type of device, or by what user, if known. The notification message additionally requests a response, which can be "approve," "reject," "report," or similar. A response can be provided by the recipient by clicking on a hyperlink associated with the selected response, for example.

If all users being sent the notification message respond "approve" then the requested task is completed. If at least one user selects the "reject" or "report" response, then a long PoP2 series is initiated, whereas if no users responded within some set time, such as 24 hours, then a short PoP2 series is initiated. Here, a short PoP2 sequence is, for example, a series of three PoP2 instances using the same system, where each is initiated at least 12 hours apart. A long PoP2 sequence is, for example, a series of seven PoP2 instances using the same system, where each is initiated at least 24 h apart, or performed in response to a randomized notification by the central system to the party who first requested the action and who is associated with the first PoP2.

In one embodiment, the length of the PoP2 sequence is determined based on how many negative responses ("reject," "report") are obtained. If any of the repeated PoP2s is contested by one or more recipients, then additional PoP2s may be added, or additional scrutiny may be added. This extra scrutiny may include an admin reaching out to the affected parties, such as both the requesting party and the party with the negative response, and request clarifications regarding the system. To a large extent, both the outreach and the associated assessment that makes up for the resolution can be automated using machine learning methods. The outcome of the resolution may be to approve the request, deny the request, add additional PoP2 instances to the series, or otherwise increase the duration over which the PoP2 series need be performed.

A person skilled in the art will appreciate that the resolution process, including both the notification with the collection of responses and the additional scrutiny and the rules associated with these will make a "temporary access" based attack highly unlikely to succeed, and that the audit possibilities associated with the requester having to identify himself or herself by providing his or her credentials, in addition to performing the PoP2, will significantly reduce the likelihood of an attack.

In some embodiments, the PoP2 requires physical presence in front of a sensor device, allowing the sensor device, if equipped with a camera or microphone, to record photos, video or voice prints associated with the requestor. In context where the requestor instead has to enter a device identifier that may have been copied into a manual, additional identifying information can be collected, e.g., using an app on a camera phone, where the app requests that a photo of the requestor is taken. The addition of an audit trail like this is beneficial to discourage abuse. The series of PoP2 instances, together with the notification messages and the processing of the responses (or absence thereof) as described above comprise a PoP3 instance. Thus, PoP3 instances are generated from one or more PoP2 instances with additional logic associated to these, where the logic is used to determine the risk of one or more challenges and responses, based on the observed reactions to the associated notifications.

It is also possible to create a PoP3 based on a series of PoP2 instances without using notifications, although this requires a larger number of PoP2 instances. For example, if a user responds to a series of PoP2 instances performed one per day for two weeks, this may correspond to sufficient security guarantees for the system to approve a request that is not considered very high risk, e.g., the removal of a user that has previously been added to the system, and which was labeled as a temporary user as he or she was added, or given access rights that were only partial. In one embodiment, the system does not use notifications as part of the structure to build a PoP3 from a series of PoP2 instances where a PoP2 method creating an audit trail is generated; an example of such a method is described below.

In the above, "reject" is a response that causes a negative signal to be sent to the system, while "report" sends both such as signal and a request for manual review by an admin or law enforcement. This can be used to rapidly escalate the review of potential high-risk abuse, by people concerned with their safety. The system can use all these three options as possible responses for the recipients of the notification messages, or a subset of these, as well as additional options that cause additional forms of review. One possible embodiment only offers a recipient two options: to not to do anything, or to respond that there is a problem by clicking on a "reject" button. Another embodiment only allows the options of not doing anything or approving the request. In the latter embodiment, the absence of approval will cause a series of PoP2s to be initiated.

One example PoP2 is for a user to, after having made a request, as described above, be told to respond to a challenge that involves one or more of the sensor devices in the collection of sensor devices associated with the request. In one example challenge that involves a sensor device that comprises an electric outlet, the user is notified to go to any electric outlet that is part of the collection and plug in and power on a lamp. The user clicks a button in an app or on a webpage associated with the making of the request after having identified such an outlet and having plugged in and powered on a lamp. The system then waits a random period of time, such as 2-20 seconds, and then generates a notification, such may comprise a message, a sound, the blinking of an icon, etc. When this happens, the user has to flick the switch of the lamp within a short period of time, such as one second.

If this is successfully performed, then a first iteration of the challenge is said to have succeeded. The system iterates this process, causing zero or more additional challenges to be generated, and for any such additional challenge, collecting and evaluating the responses. Since the central system can determine the load on the outlet, it can detect when a user flicks the switch. If a user is too slow or fails to respond to one iteration of a challenge, then additional iterations can be added to the required series, or the PoP may be determined to have failed. The PoP2 only succeeds if at least a minimum quality measure is achieved for the one or more challenge iterations, where the quality measure corresponds to how well (in this particular example: how fast) the challenges are responded to.

In another example PoP2, a Bluetooth provisioning method uses a capacitive touch interface on an outlet or a switch to assist in physical provisioning. This cannot be remotely enabled. A PoP2 instance can be built from that using the touch interface. A challenge is issued by the system. This may be displayed on a device such as a phone that the user is operating, and which is in the proximity of the outlet or switch. The challenge may be "press and hold the button on the outlet until this message disappears," or "flick the switch on and off."

In another example PoP2, a sensor device associated with a switch or outlet that is equipped with an LED is used to transmit, from the central authority, a series of pulses causing the LED to flicker, be switched on and off, or have a time-varying intensity. The user instruction may be to point the camera of an end-user device with an app detecting the LED changes to the switch or outlet, and transmit information relating to the changes of camera input back to the central authority.

In another example PoP2, a sensor device is equipped with a microphone, and the requesting user is asked to be within a short distance to the sensor device and make a sound in response to the challenge being issued. In this second example, it is, again, the time from the challenge is issued until the user response is detected that is used to compute the quality measure, and the sound is preferably a sound that is requested by the system issuing the challenge. For example, in a first challenge iteration, the user may have to read the text "kangaroo zebra eleven seven" within a threshold amount of time for the sensor device to detect; and in another challenge iteration, he or she has to read the text "again bowling says Harry" or another text that preferably is hard to predict and which preferably would not be uttered by the user otherwise.

The sensor device records and transmits the utterance to the central server issuing the challenge, where the latter determines using standard methods whether the received utterance corresponds to the challenge. Alternatively, the sensor device can perform the transcription from voice to text and transmit the text to the central server, which then performs the determination whether the challenge was correctly responded to. In both instances, this is not necessarily a binary decision, but a score corresponding to the likely degree of match between the issued challenge and the recorded utterance. This score is either used to compare to a threshold to generate a determination of whether the challenge was successfully responded to, or one or more scores can be used to make a security determination, e.g., using a proximity assessment that can be performed using a heuristic method based on sound similarities, or using machine learning methods based on training examples.

In a third PoP2 example, the requester has to take a photo of himself or herself, e.g., using the app from which he/she makes the high-risk request; and then stand in front of a device that is part of the associated collection of sensor devices and which has a camera, positioning himself or herself in a manner that another facial photo is taken. These are exported and compared, and if sufficiently similar, the PoP2 is considered to have succeeded. In addition, the system preferably determines that the photos comprise faces, and that these are the same, and that standard liveness features support that the photos are of live subjects as opposed to photos of photos. This method provides an audit trail comprising facial photos with liveness assurances. This is helpful in case a conflict resolution is needed at any point, as it allows administrators and law enforcement to determine identity of a potential abuser. Optionally, the system can use facial-recognition technology to determine whether the photographed user is a registered user, at the time of performing the PoP2.

In yet another PoP2 example, the requesting user has to place the device with the app making the request very close to a sensor device that is part of the collection associated with the request; the device and the sensor device communicate a non-predictable string obtained from the central entity issuing the challenge, using short-distance wireless methods, such as NFC or very low power WiFi, and this signal is then propagated from the receiving device back to the central entity, which compares the two signals. If they are the same, the PoP2 is said to succeed. Here, all signals transmitted over the Internet are assumed to be transmitted over a secure channel, which means an authenticated and encrypted challenge. Since the signals are transmitted by low-power wireless methods, it is not likely that they are susceptible to interception by an attacker outside the physical premises, or by anyone else who is not immediately next to the sensor device.

In yet another PoP2 example, a user initiates a request using a device equipped with GPS, and if the request is determined to be made from a location consistent with the location of the indicated collection of sensor devices then a simplified PoP is requested instead of a PoP as described above. Here, the simplified PoP may comprise a smaller number of PoP2 instances than would have been used to create a PoP3 instance had a "good" GPS location not been detected. Alternatively, thresholds can be set lower for what comprises a passing performance in reaction to a challenge, as the GPS location already comprises an indication of correct location, although not as precise as a PoP2 instance by itself. In another embodiment, a user has to perform two or more PoP2s, where at least two of these are of different types, e.g., one involving responding to challenges by flicking a switch and another one requiring taking a photo of the requester.

In yet another PoP2 example, the system causes a local change in the location of the sensor network, where the user making the request associated with the PoP2 instance is requested to respond to the local change by performing an action. Example actions include making an indication in a web form or on an app, flicking a switch, or taking another action.

In another PoP2 example, the challenge sent to the user making the request is a description of an action that is selected from a set of at least two available actions, in a manner that is not predictable to a user, and where the user has to perform the described action, and where the collection of sensor devices is configured to determine what action the user performed. Example actions comprise speaking an indicated word close to a sensor device that comprises a microphone; clapping hands in proximity of a sensor device that detects changes in air pressure and/or motion; and turning on or turning off a light, where the sensor device detects the change of current.

An entity referred to herein as a "verifier," which illustratively comprises a server or a backend device, may generate one or more challenges as part of a PoP2 instance, receive signal(s) from the collection of sensor devices associated with the PoP2 instance, and based on these signals determine whether the observed actions correspond to the described actions in the challenge. A person skilled in the art will recognize that there are many more actions that can be part of a challenge, and the types of challenges and corresponding actions are simply dictated by the types of sensors that are incorporated in the one or more sensor devices that are part of the network with which the PoP2 is associated.

PoPs can be used whenever there is a request for a transaction that is determined, whether using a scoring system or a static rule set, to have a risk that exceeds a threshold. For example, a user may have to respond to a PoP to change the payment method associated with a subscription of an account, to set up automated forwarding of notifications, to delegate a right or capability, or similar. A person skilled in the art will recognize that the descriptions and uses of PoPs herein are just for illustrative purposes, and should not be seen as limiting in any way.

In some embodiments, a PoP3 instance comprises at least one PoP2 instance, followed by an automated notification of already registered communication accounts, in which the notification comprises at least one response method that allows the recipient to respond to the notification. The response method could, for example, involve utilization of an email message, a web request, an option to respond to the notification message, e.g., "text YES to agree," and other similar arrangements, or combinations thereof. The PoP3 instance further comprises an evaluation engine that optionally receives a response related to the notification message, and determines whether to generate additional PoP2 instances, initiate additional scrutiny, or approve the request associated with the PoP3 instance. A PoP2 instance comprises a method to receive a signal, by the entity performing the PoP2 verification, where the signal provides evidence of a local presence to the sensor device collection associated with the PoP2 instance.

We will now describe by way of example how various adversaries fare in the context of an example PoP3 instance. A hacker without physical proximity will most likely fail to pass the first PoP2 instance of the PoP3 instance, since he will not be able to respond correctly to the challenge. A guest or another person with temporary access to the premises, and therefore, with temporary physical proximity to the associated sensor device collection, on the other hand, is likely to pass the first PoP2 instance, causing a notification message to be sent to at least one registered legitimate user.

If this user responds negatively, then the adversary will be forced to perform a series of additional PoP2 instances. We assume that this is sufficiently long for not all of the instances to succeed. We further assume that the resulting notification responses will not be positive, but either negative or no response at all, which will further extend the length of the series. To the extent that later PoP2 instances in this series are more demanding, they will also be increasingly more difficult to pass, even for somebody with recurring temporary physical access. Therefore, this adversary is also unlikely to succeed. The same is true if the response to the first notification message is missing: this, too, will cause the extension of the length of the series of PoP2 instances that are part of the PoP3 instance.

Consider now a previously registered user, who is no longer a wanted user but who has in the past had access to the system and is now attempting to perform a task that is considered high-risk. An example of such a task is to remove the registration of another legitimate user, who remains in the premises associated with the collection of sensor devices. This assumed adversarial user will not likely pass the first PoP2 instance of the PoP3 instance, and will therefore not even trigger the transmission of notification messages, and even less so pass the PoP3 instance. However, should the assumed adversary have temporary physical access, then he may pass the first PoP2 instance of the PoP3 instance; however, this will result in the transmission of the notification messages. The legitimate user remaining in the premises associated with the collection of sensor devices and therefore with the PoP3 instance is not likely to make the mistake to respond positively to the notification messages (especially if there are multiple additional system warnings, such as "If you approve the request, you will no longer be able to access this system. If you want to proceed and approve the request, then type 'I AGREE THAT I SHOULD NOT HAVE ACCESS TO THE SYSTEM REFERRED TO AS LUCY'S APARTMENT' and click SUBMIT. If you do not want to remove yourself and promote eviljoedoe@gmail.com to admin, then click here. Click here to speak with an operator." This adversary is not likely to succeed with the abuse, either. A person skilled in the art will understand that these security assurances hold for a PoP3 instance based on any of the various alternative PoP2 instances, and will also understand that any of these alternative embodiments also will assure a person with persistent physical access to the collection of sensor devices access to the resource protected by example PoP3 instance.

Example notification messages include but are not limited to an email message, an SMS message, a robocaller message, and information sent to an app over the Internet. As a notification message is presented to an end user, the end user is preferably provided an explanation of the context, such as "A user with the phone number (123) 456 7890 wishes to be added to the network called DAN'S HOUSE. Click here to accept the request. Click here to deny the request. Click here if you suspect that the request is a spam message" wherein the underlined words correspond to hyperlinks, mail-to links, or other related links that cause a signal to be sent to the verifier, which is the central authority. Here, the link to accept the request corresponds to a positive response, whereas the other two links correspond to negative responses.

Alternatively, a voice message can be played to the recipient, such as a voice message explaining "A user named—NAME—wishes to be added as an administrator to the network Lucy's apartment," where NAME represents a recording made by the requester, of his or her name, "Please press 1 or say yes to approve. Press 0 or say no to reject. Press # or say help to speak with an operator." Here, pressing 1 or saying yes is a positive response, whereas pressing 0 or saying no is a negative response. Pressing # or saying help allows the user to ask an admin for help understanding the request, after which either the user or the admin can enter the appropriate selections based on the preference of the user.

Another example is an SMS stating "alice123@gmail.com wishes to be added as a user to 'Bob's place.' Reply YES to approve the request. If you do not approve the request, no action is required. To report abuse, reply SPAM." Here, replying YES is a positive response, and replying SPAM is a negative response. Not replying anything can be seen as a response that causes additional scrutiny in the context of a PoP3 embodiment, as described in more detail elsewhere herein.

Similarly, an app can cause a user notification, e.g., by a sound signal, by indicating pending actions, or other methods, and then present information such as "A user with email address alice123@gmail.com wants to be added as a guest to 'Bob's place.' To approve, click here. To deny, click here. To change the type of access for alice123@gmail.com, click here." Here, the approval action is a positive response, the denial action is a negative response, and the third response allows the respondent to modify the access rights of the requesting user and then, whether implicitly or explicitly, provide a positive response for the updated access rights.

The system can also present a photo or a recorded message from the requestor, or additional information about the request. Such information, when available, is preferably presented to the parties receiving the notification. In a preferred embodiment, the system first determines that the additional information satisfy certain quality or liveness criteria, such as not being a photo of a photo or a photo of a video, but a photo of a real person, or a message that comprises background noise that is not indicative of an unsafe or unwanted context, or context or recorded in another location than the sensor device collection associated with the PoP instance.

In one PoP2 instance, the user making a request is asked to move from one area of a building (say, the TV room) to another (such as the bedroom) to generate a response to a challenge corresponding to those two locations. In one version, the user would simply walk from one location to the other, and the local system would determine the movement from one area to the other using proximity sensors; by observing changes in the wireless network, which are affected by the changes of physical presence due to reflection of radio waves; by detecting changes of sounds; etc. In another version, the location of the user is determined by triangulation by wireless sensors to a wireless communication device, such as a phone.

The system can present the challenges, such as "move to the bedroom" or "move to the room from which you hear beeps," on a smartphone used by the user to initiate the PoP2 instance, or by playing a message using loudspeakers associated with the sensor devices. For example, the system may play the challenge voice message to the user using one or more loudspeakers, where the challenge may be to "go to the outlet that blinks and beeps," after which one outlet is activated to blink and beep. As the user arrives in the proximity of the blinking/beeping outlet, the system would conclude that the challenge was completed, provided a threshold amount of time such as two minutes, did not elapse since the challenge was posed.

A person skilled in the art will recognize that there are countless variations to the PoP2 instances presented herein, and will understand that these can be combined and varied according to the underlying principles associated with these examples.

In one PoP3 embodiment, two types of PoP2 instances are used. A first PoP2 instance emphasizes usability, and may involve the user making a request using an app on a communication device that is located close to a sensor device of the sensor device collection associated with the PoP2 instance, where the communication device and the sensor device are connected using a short-distance wireless method such as BLE or NFC, or where WiFi and triangulation is used to determine that the sensor device and the communication device are within a threshold range. One well-known method for doing this was described by S. Brands et al., "Distance-Bounding Protocols," Extended Abstract, 1993. Other related methods are well understood by people skilled in the art. Note that the first PoP2 instance does not require that the user flicks switches, reports local changes, takes photos, etc. However, a second PoP2 instance, which is optionally deployed as part of the associated PoP3 instance if the notification message does not result in a positive feedback, may be more involved for the end user but provide additional assurance of physical proximity. This approach maximizes usability, and only depends on less convenient PoP2 embodiments if the PoP2 proof is contested, e.g., responded to in the negative, or not responded to, as applicable.

In one embodiment, a conflict resolution mechanism is used to determine how to resolve a situation in which, during one time period (such as a 6-hour time period after the transmission of a notification message), there is both a positive response and a negative response. When this happens, the conflict resolution mechanism temporarily ignores both the positive and the negative response and initiates a set of challenges corresponding to a separate PoP2 instance with each of the respondents. The PoP2 instance is tied to the identity of the respondent by sending to the communication accounts of the respondents a message comprising a challenge, a hyperlink to a challenge, or to a webpage or app feature that activates a PoP2 instance. If one of the two or more respondents in conflict successfully completes the PoP2 instance provided, but another of the two or more respondents does not, then the positive or negative response of the party that succeeded with the PoP2 instance is counted but the positive or negative response of the party that failed the PoP2 instance is ignored.

This prevents an attack in which a malicious user creates multiple personas to use for what is commonly referred to as a Sybil attack to approve or reject requests according to the wishes of the malicious user. An example of such an attack is an ex-spouse creating multiple personas before moving out of a home corresponding to a PoP instance, with the aim of trying to resist being removed, or with the goal of trying to remove the remaining user that is still in physical proximity of the collection of sensor devices, i.e., the PoP instance. This approach can also be applied to any user responding positively to a notification message: before the system reacts to the positive response, it issues a PoP2 instance to the user responding positively; the user has a set time (such as 24 h) to respond to this set of challenges before the system takes an action relative to the matter in which the user with the positive response reacted. Similarly, this approach can also be selectively be applied to other types of responses, such as any elevation to conflict resolution with a customer representative; any negative response to a notification message; etc.

A person skilled in the art will recognize that this approach of challenging select users as a result of their actions, including but not limited to responses to notification messages, is another beneficial use of PoP2 proofs, and that PoP3 instances can also be used to further improve the robustness and security of the system.

In one embodiment in which the system sends PoP instances to users in response to their actions, these PoP instances are not running at the time they are sent, e.g., the timing for their challenges have not started. Instead, a link to an instance is sent, allowing the recipient to start engaging in the PoP instance at any time within a time limit, such as within 48 hours. The instance recipient indicates that he or she is ready to engage with the PoP instance by clicking on a hyperlink, selecting an option in an app, responding to a message, or engaging with one or more sensor devices associated with the PoP. Preferably, the user would receive reminders as the time for engagement in running out, e.g., "You now have only 2 h left to perform the PoP, to get started, make sure you are in 'Bob's apartment,' then click here."

In one embodiment, the system identifies the notification messages sent within one session by a counter that is referred to as the round. Here, a session corresponds to a collection of PoP instances that are associated with the same initial triggering event, where an example triggering event is the receipt of a request from a user to make a change to the state that is considered high-security, sensitive, or otherwise in need for a PoP verification. The round counter starts at zero, and is incremented each time the party triggering the PoP session performs a PoP. As this happens, notification messages are generated and sent, and based on whether these are responded to, and by how many registered users they are responded to, additional PoP instances are initiated. These additional PoP instances correspond to consecutive rounds.

In one embodiment, as the round counter increases, the PoP instances are selected by the system in a way to further reduce the risk of error, at the potential expense of usability. This may mean that a first round PoP instance simply requires that the user is in the proximity to a sensor device; a second round PoP instance may also require a user action, such as clicking a button, speaking a word, or turning on and off the lights; a third round PoP instance may require several actions, such as clapping hands or stomping feet in a way that coordinates with a strobe light from either the sensor device or a mobile device such as a phone; a fourth round PoP instance may require the same type of user action as the third round PoP, but in addition, may also require that the user provides the answers to life questions, such as "what is the last four digits of the credit card used to pay the monthly subscription," or "in what city were you born," where these life questions may be associated with either an account/subscription or a specific user associated with the account/subscription.

At the same time, after a certain round is reached, such as the fourth round, the responder corresponding to a notification message may be required to complete a PoP for the response to be accepted. In one alternative, only some types of responses, such as negative responses, require that the respondent passes a PoP. Similarly, the respondents to the notification messages may have to perform increasingly complicated PoPs, and may be required to also provide additional information or perform additional tasks, just like the person triggering the event that led to the PoP. This general notion is referred to as an escalation of the PoP selection. A person skilled in the art will recognize that this can be achieved in a great variety of ways, and that the above examples are simply for illustrative purposes.

Numerous PoP examples have been described herein in the context of home automation technologies. A person skilled in the art will recognize that there are many other useful scenarios for the disclosed techniques, including, for example, other IoT applications, and as a fraud-prevention method of use for purposes of throttling potential abuse (e.g., in the context of registering multiple accounts); to connect a pseudonymous identity to a real-life location; for a user to assert a location; prove plausible residence in an area; a membership (such as working for a particular company); the right to file a complaint or a review, by virtue of being in a location associated with a business or service provider; to help prove identity for applications related to reset of passwords or recovery of lost information; to bootstrap systems (such as a new phone) to a cloud storage system storing sensitive data belonging to a user who lost his old phone or other access device, and more. A person skilled in the art will therefore appreciate that there is a tremendous range of benefits and opportunities associated with the development and deployment of PoP.

Example sensor devices include but are not limited to: smart devices, routers, home and enterprise burglary alarm systems, etc. A smart device is a device that is connected to the Internet or another network, allowing remote determinations of state or remote control of the device. Example smart devices include but are not limited to smart outlets, smart fuses, smart switches, smart appliances, smart thermostats, smart car security systems. A person skilled in the art will recognize that this list is only for the sake of concrete examples, and is not limiting on the scope of the disclosure in any way.

In one embodiment, requests are classified not only in terms of whether they are high-risk or not, but according to a larger number of categories. The system responses to such requests depend on the associated category, and optionally, to a policy associated with the category. For example, in an enterprise or residential deployment, anybody with physical access to an outlet is permitted to plug in a cord and draw a current; however, in a campground deployment, this right may be associated with paying a fee, and requires a user to input billing information. In order to gain access to a WiFi network, one consumer allows anybody in range to do so, whereas another has set the policy only to allow guests that know a password, and yet another requires physical proximity (corresponding to a PoP2 instance) to automatically receive a 24 h pass. One enterprise may allow anybody completing a PoP2 instance involving wireless proximity to a sensor device to gain a pass to the guest network until midnight the same day, while another also has the limitation that the requester needs to complete a PoP3 instance in order to upload data exceeding 1 GB.

One network may have three types of access levels, corresponding to (1) time-limited write access (where write access allows wireless control of the system, and the time-limited aspect may correspond to one day, but only if the party is determined to be on the premises); (2) limited read access (to determine whether the doors are locked, the oven off, etc.) and limited write access (to lock and unlock doors, and remotely turn off the oven); and (3) full read and write access to all functionality exposed to end users. For each one of these three example access levels, the system may associate different types of PoP instances, and with different parameter choices. For example, all of these may require PoP3 instances, but the third type may be associated with a PoP2 instance that is more arduous to complete for the requester than the other two. This may mean that the requester in the third case is not permitted access if there is not unanimous approval of all registered level-3 users, whereas the requester in the second case is allowed if there is approval by at least one level-3 user or all registered level-2 users, or if nobody who receives a notification request responds with a refusal within two weeks.

The first type of access may be even simpler to obtain, and may be given to any requester who gets the approval of at least one registered user with the right to delegate access rights, or if there is no refusal generated within a designated time period (e.g., three days). Similarly, different types of requests may have different associated levels of severity for the associated PoP instances, for example, adding a user to the system may require less stringent scrutiny than removing a user, except if the party making the request has a higher-level access right than the party to be added or removed.

A person skilled in the art will recognize that the system can be guided by policies such as those described above, but that alternative policies can also be used, and that the above descriptions are only for explanatory purposes.

A person skilled in the art would also appreciate that the disclosed technologies can be used to secure homes, offices, stores, restaurants, cars, RVs and other spaces where logical access should become associated with physical access. It is beneficial for users with access to multiple physical objects or areas to combine accounts, pool information between the objects/accounts, or otherwise tie them together for purposes of deriving observations from combinations of them.

In one embodiment, a security determination is made after a user makes a request to the system and is granted the request. The approval may happen, for example, as a result of one or more existing users with access to the system associated with the request agreeing to the request, or after a silence of one or more existing users, or even in spite of a refusal of one or more existing users. These, and other variations of such scenarios, lead to different security assessments and resulting security actions. For example, a user who is given access to a system in spite of a refusal may not be given retroactive access to system data, e.g., may not be allowed to download data associated with system observations made before the access request, or alternatively, before the approval of the access request. In contrast, a user who is given access after a request that was not followed by a disagreement, i.e., for which there was no refusal, may be given retroactive access to some forms of metrics with low privacy impact, e.g., general usage data. As another example, a user who is given access to the system after a request that was followed by a unanimous approval of the request may be given full retroactive access to data that corresponds to the time that the approving user has had access to the system, or alternatively, to match the access rights of the approving user with the highest "rank" (e.g., admin/owner is higher than tenant/user, which in turn is higher than guest.)

In one embodiment, the system derives predicates associated with different users with access rights. For example, based on the duration of time that a user has had access to one or more systems observed by a backend, the user may be associated with an age predicate that may, for example, have five different values. These values may correspond to an age exceeding two years, an age exceeding one but not two years, an age exceeding 6 months but not 12, an age exceeding less than 6 months but greater than zero, and an age of zero which corresponds to not having been observed in the system. A person skilled in the art will recognize that other types of age assessments can also be made, including a simple time-based assessment that corresponds to the date of the first observation of the user.

Here, users are associated with account identifiers, such as confirmed phone numbers or confirmed email addresses, where an account is confirmed if the system knows, by having communicated with the user on the account in question, that the user has access to the account. The age predicate of a user is helpful for some security assessments. For example, in determining the risk that a given user is a Sybil account, i.e., one registered simply as a pseudonym of another user, for the sake of that user having multiple accounts to control the system with, there is lesser risk for this when a user of an "old" account is observed than when one with "zero age" is observed. While this makes such a "zero age" user potentially less worthy of trust in a conflict in which that user is requesting access to a system where an older existing user has access already and refuses the requesting user's request; that does not however, make the "zero age" user a higher risk for the purpose of other transactions, such as registering a new account for the first time.

The selection of system parameters, such as the number of rounds to run an escalation of a request before it is resolved, are preferably influenced by the age predicates of the user in conflict, as a way for the system to streamline the process. The age of the account may also be used to generate a prediction of the certainty of a security assessment associated with the user, wherein older accounts are associated with a higher certainty than younger accounts.

A second predicate is associated with whether the user has been in conflict with another user and prevailed, and a third whether the user has been in conflict with another user and not prevailed. Here, prevailing corresponds to winning an escalated conflict. It is valuable for the system to combine predicates. Combining predicates is helpful to derive security assessments. For example, if a first user with a sufficiently old account (e.g., older than a year) has been in conflict with another sufficiently old account and has not prevailed, that is potentially associated with a greater risk that this user will be in conflict onwards, and may lose such a conflict, in comparison with a user that has always prevailed or a user that has a young account and for which there is no history.

Correspondingly, the system generates and stores user predicates, and uses these (whether alone or in combination with each other) to generate security assessments associated with the users and accounts. Some of these assessments are performed using rule-based criteria, as described above for the combination of the age predicate and the conflict predicate; other assessments are made using machine learning methods, and are based not on a logic of combination known by the system designer but instead made to minimize the risk of error of a correlation-based assessment. The results of the security assessments may also be considered predicates of the users, and can be used, in turn as inputs to other security assessments.

One example security assessment is the generation of parameters governing the operation of a PoP protocol, including the choice of PoP2 instance, the number of rounds required for a given PoP3 instance, and whether the responder to a notification request should be required to pass a PoP2 instance for his or her response to be considered in a certain round of an escalation of a PoP3 instance.

A person skilled in the art will recognize that whereas the concrete examples of the operation of illustrative systems in the figures do not use the predicates or the associated assessments, that this is meaningful and beneficial, and that the simplified examples are merely for illustrative purposes.

In another embodiment, a first user initiates a challenge to a second user, causing the system to notify the second user. When initiating the challenge, the system optionally requests the first user to select a minimum collection of time periods, each of a minimum duration, that the second user will be provided with. In an alternative embodiment, the system will generate such a collection of time periods, and in yet another embodiment, the second party, upon being notified by the system, will be asked to select such a collection. If both the first and the second users propose time periods, then the system selects at least one time period that was proposed by both the first and the second user. Alternatively, if the system generated a proposal, both the users may be offered the opportunity to select what time periods among the suggested time periods of the proposal that the user approves. Yet another alternative is for one of the two users to propose at least one time period and the other user agreeing to that time period. Once both users have agreed to a time period in one of these ways, or an alternative way resulting in a similar outcome, the system will notify both the first and the second user and identify the time period that was agreed to. This time period may be a portion of time periods that was proposed or accepted. During this time period, the challenged user, namely the second user, must pass the challenge, as described in this disclosure.

In one alternative embodiment, both the first and the second user each has to pass a challenge during the agreed-upon time period. This challenge may either be described beforehand by the system, or be implicitly known ahead of time, or may be described during the agreed time period. As an example of the former approach, a challenged user may have to place his or her phone or other mobile device within radio range of one node of the system within the selected time period, and optionally perform an action such as clicking a button on the mobile device. As an example of the latter approach, each challenged user may be given a randomly selected action to perform, by the system, such as to turn the lights on in the TV room, then turn them off, then on again, repeating this five times in rapid sequence. Other actions and ways to respond to the challenge are described in this disclosure, and are illustrative examples of actions rather than a complete list of actions.

Additional illustrative embodiments will now be described in detail with reference to FIGS. 1 through 4. The particular arrangements of devices and their operation as illustrated in these figures should not be construed as limiting in any way.

Figure 2:
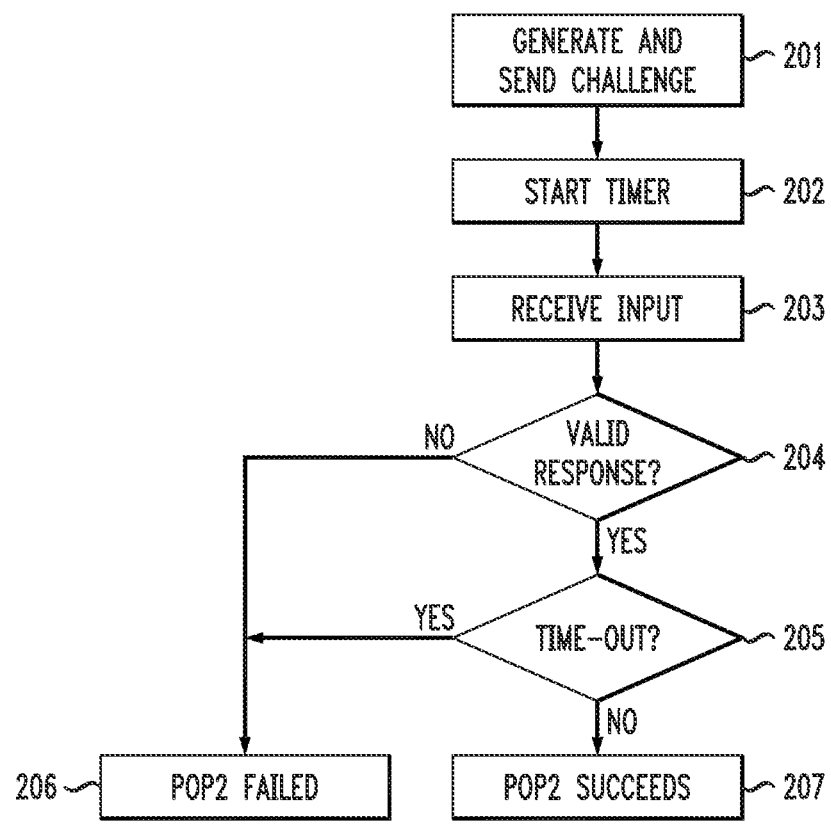
Figure 3:
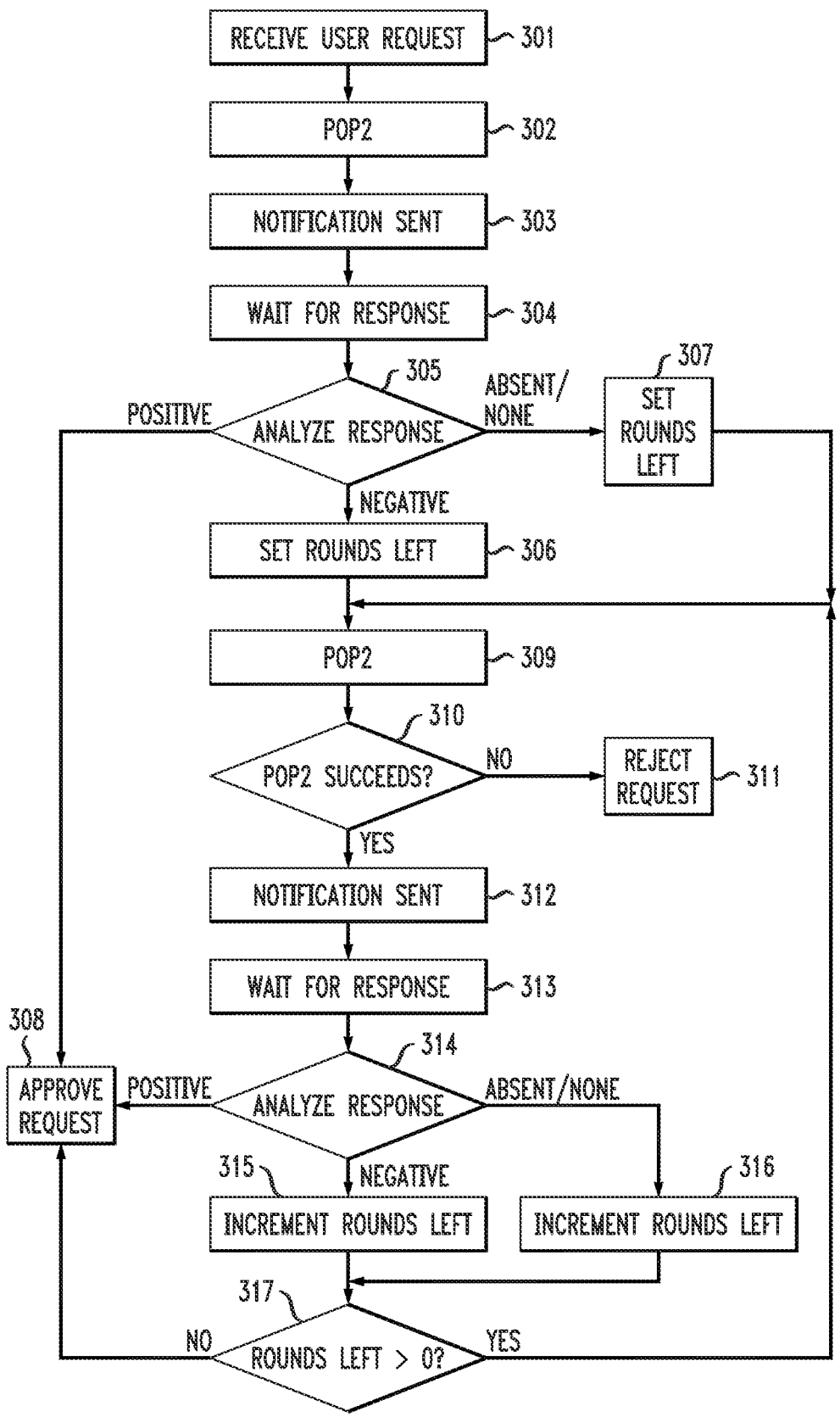

FIGS. 1, 2 and 3 are flow diagrams of example access rights management processes using proofs of physical presence in illustrative embodiments. The proofs of physical presence in these embodiments illustratively comprise instances of the PoP2 and PoP3 protocols as previously described herein, but other types of protocols for establishing proof of physical presence can be used. Embodiments disclosed herein should therefore not be viewed as being limited to any particular PoP2 and/or PoP3 examples.

FIG. 1 shows an example embodiment of a PoP3 instance. In step 101, counters are set. Example counters include a counter that counts the number of remaining PoP2 instances that have to be performed. In addition, parameters reflecting the number of PoP2 instances needed based on various feedback scenarios can be set here, or could be hardwired into the system. The system also looks up the number of registered users there are for the associated account. This can be used to determine when a sufficient number of users have responded to a notification. In step 102, a PoP2 instance is performed. Example PoP2 instances are described in FIG. 2. In some implementations of the FIG. 1 embodiment, if this PoP2 instance fails, the request is aborted at that point (not shown in diagram), and for such implementations the following description assumes that the PoP2 instance has succeeded. In step 103, a notification message is sent to at least one registered user. In step 104, a timer is set. For example, it may be set to 24 h, meaning that the collection of feedback resulting from the notifications will be performed for up to 24 h. In addition, counters describing the number of positive feedback responses and the number of negative feedback responses are set to indicate that no feedback of either type has yet been received for the PoP2 instance of step 102.

In step 105, the system determines whether new feedback has been received; if it has, the system continues execution at 106, and otherwise at 107. At step 106, it is determined whether the new feedback is positive or negative. If it is positive, the system branches to step 108, otherwise to 109. At step 108, a counter indicating the number of positive responses is incremented, and the new feedback is erased. At steps 108 and 109, the system also records the identity of the user providing the feedback, so that additional feedback from this user can be ignored until a new invocation of the PoP2 instance of step 102 has been performed. At step 109, a counter indicating the number of negative responses is incremented, and the new feedback is erased. At step 107, it is determined whether a time-out has been reached, i.e., the timer set in step 104 has reached a threshold value. If no, then the system goes to 105; if yes, then it proceeds to step 110. At step 111, it is determined whether a sufficient number of users, as looked up in step 101, have provided feedback. If an insufficient number of users have provided feedback, the system branches to 105, otherwise to 110.

At step 110, a security determination is performed. This security determination is made by comparing the number of positive responses to a first threshold, comparing the number of negative responses to a second threshold, or comparing the total number of (positive or negative) responses to a third threshold, or any combination of these comparisons. In addition, the system may modify counters according to these comparisons or the values underlying these comparisons, where these counters indicate how many more PoP2 instances need be executed to establish certainty. In step 112, it is determined whether the security determination is positive, negative or undetermined, where the latter corresponds to a situation where additional PoP2 instances need to be performed to gain certainty. If the security determination is negative, then the system proceeds to step 113. If the security determination is positive, then the system proceeds to step 114. If the security determination is uncertain or the counters for the number of remaining rounds of PoP2 instances needed indicate that more instances are needed for certainty, then the system proceeds to step 102, in which a new PoP2 instance is requested and/or performed. In step 113, an access right control request is rejected. In step 114, an access right control request is approved.

FIG. 2 shows an example PoP2 instance. In step 201, a challenge is generated and communicated to a user. In step 202, a timer is started. In step 203, the system receives an input, such as a sensor input. In step 204, it is determined whether the received sensor input is a valid response to the challenge; if it is, the system proceeds to step 205, otherwise to step 206. In step 205, it is determined whether less than a threshold amount of time has elapsed since the timer was started; if it has, then the system proceeds to step 207, otherwise to step 206. In an alternative embodiment, the system branches from step 205 to step 203 instead of to step 206. In step 206, it is determined that the PoP2 instance failed. In step 207, it is determined that the PoP2 instance has succeeded.

FIG. 3 shows one example embodiment of the system. In step 301, the system receives a request from a first user. In step 302, the first user is challenged in a PoP2 instance. If this fails, the request is aborted (not shown in diagram), otherwise the system proceeds with step 303, in which a second user is sent a notification message. The second user is a registered user. In step 304, the system waits for an optional response from the second user, where the optional response is associated with the notification message of step 303. In step 305, the optional response is compared to three possible results; if the response is negative, then the system branches to step 306; if the response is missing (i.e., the second user did not respond) then the system branches to step 307; and if the response is positive, then the system branches to step 308. In step 306, a variable roundsleft is set to 5. In step 307, the variable roundsleft is set to 2.

In step 308, the system approves the request from the first user. In step 309, the first user is challenged in a PoP2 instance, and the variable roundsleft is decreased by 1. This has to be completed successfully within a set time, such as 6 h. In step 310, the system determines whether the PoP2 instance of step 309 was successfully completed within the set time. If it was not, then the system branches to step 311, otherwise to step 312. In step 311, the request by the first user is rejected. Additionally, this user may be blacklisted, or a policy set to require additional effort from the user to initiate additional requests. In step 312, a notification message is sent to the second user. In step 313, the system receives an optional response to the notification message of step 312. In step 314, the system branches based on the optional response of step 313: if the response is negative, the system branches to step 315; if it is missing, the system branches to step 316; if it is positive, the system branches to step 308. In step 315, the variable roundsleft is incremented by 0.5; in step 309, the variable roundsleft is incremented by 0.2. In step 317, it is determined whether the variable roundsleft is greater than 0; if it is, the system branches to step 309, otherwise to step 308.

Adding a non-integer number of rounds based on an observation as in the illustrative embodiment described above has the effect of combining a weight associated with the observation with the number of rounds. If one event is associated with 0.6 rounds, a second with 0.7 rounds, and a third with 1.8 rounds, then if all three take place, 3.1 rounds are accumulated, and the system may perform three rounds, whereas if only the two former take place then 1.3 rounds will be accumulated and the system performs just one round. A person skilled in the art will recognize that other combination methods may be used, and that these may be non-linear, meaning that particular combinations may cause a much greater number of rounds than the sum of the rounds associated with each individual observation associated with the combination. A person skilled in the art will also recognize that another approach is to associate different observations with integer numbers of additional rounds, or with a function that determines the additional number of rounds based on the series of observations that has been made during the one or more rounds associated with a PoP instance.

The particular processing operations shown in the flow diagrams of FIGS. 1 through 3 are presented by way of example only, and should not be construed as limiting in any way. For example, the ordering of the steps can be varied, and additional or alternative steps can be used in place of the particular steps shown. It is also possible that certain steps can be performed at least in part concurrently with one another instead of in the particular order illustrated in the flow diagrams.

Figure 4:
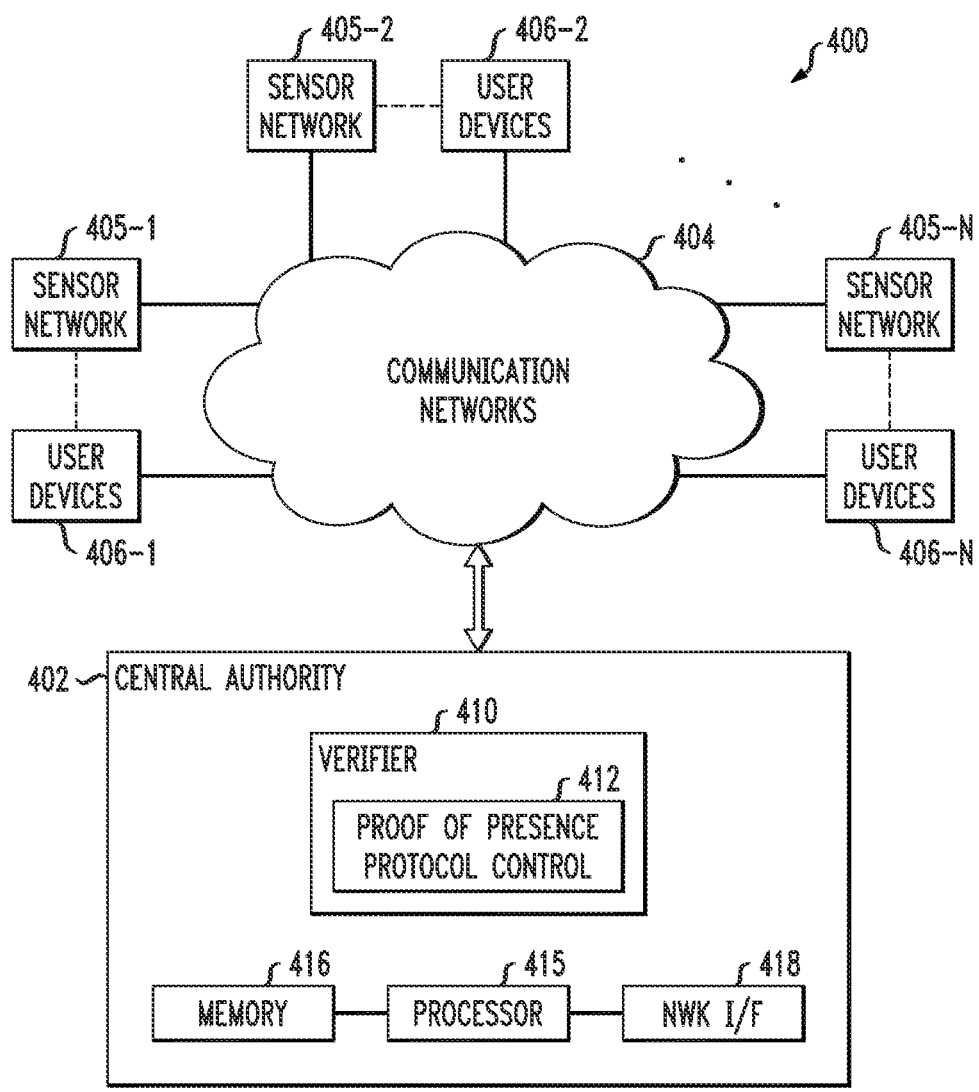
FIG. 4 is a block diagram of an information processing system configured with functionality for managing access rights of transferable sensor systems in an illustrative embodiment.

Referring now to FIG. 4, an example information processing system 400 of an illustrative embodiment is shown. The system 400 in this embodiments is configured with functionality for managing access rights of transferable sensor systems. For example, the system 400 is illustratively configured to execute processes of the type previously described in conjunction with FIGS. 1 through 3.

The system 400 more particularly comprises a central authority 402 coupled via one or more communication networks 404 to a plurality of distinct sensor networks 405-1, 405-2, ... 405-N. Each such sensor network is assumed to comprise a set of sensor devices of the type described elsewhere herein. A given set of sensor devices is also referred to herein as a "collection" of sensor devices. The sensor networks 405-1, 405-2, ... 405-N interact with respective sets of user devices 406-1, 406-2, ... 406-N. The sets of user devices 406 are not necessarily disjoint, as some of the user devices can interact with multiple ones of the sensor networks 405. The user devices 406 can comprise, for example, desktop, laptop or tablet computers, mobile telephones, smart watches, gaming systems or other types of devices associated with one or more system users and capable of communicating with central authority 402 over the communication networks 404.

The dashed lines between the user devices 406 and the sensor networks 405 are intended to encompass a wide variety of different types of interaction that can be supported in a given implementation. Such interactions are not limited to machine-to-machine communications using wired or wireless communication protocols, but more generally encompass visual, aural, haptic and/or other types of interaction. For example, a sensor device can present an image to a user via a display, and/or play an audio file to a user via a speaker, in conjunction with the performance of one or more proof of presence protocol instances, such as the PoP2 and/or PoP3 instances described above.

The central authority 402 illustratively comprises a processing platform that includes one or more processing devices. For example, the central authority 402 can be implemented as one or more computers, servers or backend devices that are configured to maintain access rights for the sensor networks 405. In other embodiments, multiple separate central authorities can be provided, each having responsibility for controlling the access rights of a different subset of the sensor networks 405. The term "central authority" as used herein is intended to be broadly construed, so as to encompass a computer, server or backend device coupled to a network, and should not be viewed as requiring any particular geographical relationship relative to the particular sensor networks 405 for which it is responsible. It is referred to as "central" in this embodiment in that it provides a common control point for controlling the access rights of multiple ones of the sensor networks 405.

One or more of the sensor networks 405 may each be viewed as an example of what is referred to herein as a "transferable sensor system." Such a system as the term is generally used herein is intended to encompass a sensor system, such as a home or office sensor system, for which access rights may be transferred from one user to another over the course of time, as in the case of the tenants of a house or apartment changing over time, or the employees of an office facility changing over time. A given one of the sensor networks 405 can therefore comprise a plurality of sensor devices deployed within an interior space and/or an exterior space of a residence or business. Numerous other arrangements are possible.

As indicated previously, illustrative embodiments advantageously provide enhanced security in these and other situations involving transferable sensor systems, as well as in numerous other contexts involving sensor systems. It is to be appreciated, however, that other types of sensor systems, and more generally sets of sensor devices, can be utilized in other embodiments. Accordingly, embodiments disclosed herein should not be viewed as being limited in any way to use with transferable sensor systems.

The central authority 402 in the present embodiment comprises a verifier 410 that implements a proof of presence protocol control module 412. The control module 412 initiates and otherwise controls the performance of proof of presence protocol instances, such as the PoP2 and/or PoP3 instances described above.

The verifier 410 and its associated control module 412 are illustratively implemented at least in part in the form of software running on a processing device that includes processor 415 coupled to memory 416 and network interface ("Nwk I/F") 418. Example implementations of such components are described in more detail below.

In operation, the verifier 410 receives from a requester a request to modify a parameter of an access-controlled account associated with a set of sensor devices, such as a particular one of the sensor networks 405, illustratively sensor network 405-1. The requester is illustratively a user associated with a particular one of the user devices 406, although other types of requesters may be present in other embodiments. The request is processed by the proof of presence protocol control module 412 to determine whether the request should be approved or rejected. If the request is approved, the access rights of the sensor network 405-1 are adjusted to modify the parameter as specified in the request. For example, the requestor may be added as an authorized user to the access-controlled account. Numerous other types of parameter modifications can be made in managing access rights to the sensor network 405-1. If the request is rejected, no parameter modification is made to the access-controlled account, and the corresponding access rights of the sensor network 405-1 therefore remain unchanged.

Responsive to receipt of the request, the verifier 410 initiates at least one instance of a proof of physical presence protocol, the proof of physical presence protocol requiring performance by the requester of at least one action involving at least one sensor device of the sensor network 405-1 associated with the access-controlled account. As an example of such an arrangement, initiating at least one instance of a proof of physical presence protocol illustratively comprises initiating respective instances of the proof of physical presence protocol in each of a plurality of iterations. The one or more notifications are sent responsive to successful completion of the proof of physical presence protocol in each of the iterations. Terms such as "initiate" and "initiating" in the context of multiple instances of a proof of physical presence protocol therefore should not be construed as requiring that all such instances of the protocol be initiated at the same time, and are instead more broadly used herein to encompass arrangements in which, for example, a process is triggered that incorporates multiple instances of the protocol performed over respective different periods of time.

Responsive to successful completion of at least one instance of the proof of physical presence protocol, the verifier 410 sends at least one notification to each of one or more registered users of the access-controlled account. The term "registered user" is intended to be broadly construed so as to encompass any user having a communication address (e.g., IP address, email address, mobile telephone number, etc.) or other contact information recorded with the central authority 402 in association with the access-controlled account. Thus, a "registered user" need not have gone through a registration process with the central authority 402. Instead, by way of example, contact information for that user may have been provided by another user that has gone through a registration process. Other techniques can be used to register users as that term is broadly used herein.

The request is approved or rejected based at least in part on at least one of a number and a type of responses to the one or more notifications. As an example of such an arrangement, approving or rejecting the request based at least in part on at least one of a number and a type of responses to the one or more notifications illustratively comprises aggregating numbers of responses for each of a plurality of different response types over multiple iterations, wherein for each of the multiple iterations a corresponding one of the instances of the proof of physical presence protocol is initiated and if successfully completed the one or more notifications are sent. The request is then approved or rejected based at least in part on the aggregated numbers of responses.

In some embodiments, an action required to be performed by the requester in a given one of the one or more instances of the proof of physical presence protocol illustratively comprises executing a specified type of detectable interaction with at least one of the sensor devices of the sensor network 405-1. Numerous examples of such detectable interaction are described elsewhere herein.

In some embodiments, a first one of the one or more instances of the proof of physical presence protocol is performed and if successfully completed the one or more notifications are sent. Responsive to the request not being approved based on responses to the one or more notifications sent after the successful completion of the first instance of the proof of physical presence protocol, one or more additional instances of the proof of physical presence protocol are initiated, wherein each of the first and additional instances requires performance, by the requester, of a different action involving at least one sensor device of the sensor network 405-1 associated with the access-controlled account, and wherein one or more additional notifications are sent responsive to successful completion of each of the one or more additional instances of the proof of physical presence protocol.

The verifier 410 is configured to classify each of the responses to the one or more notifications into a plurality of different response types including (i) a negative response, (ii) a positive response, and (iii) an absence of an expected response. The term "response" as used herein is therefore intended to be broadly construed, so as to encompass, for example, positive and negative responses, as well as a missing or otherwise absent response. An absence of an expected response is illustratively indicated by a failure to receive a response to a corresponding notification with a predetermined time-out period.

A number of instances of the proof of physical presence protocol that must be successfully completed in order to obtain approval of the request may be increased responsive to at least one of a negative response and an absence of an expected response to the one or more notifications. An amount of the increase in the number of instances of the proof of physical presence protocol is relatively high for a negative response and relatively low for an absence of an expected response. Numerous other types of adjustments can be made.

In some embodiments, at least one of a negative response and an absence of an expected response to the one or more notifications causes at least one additional instance of the proof of physical presence protocol to be initiated.

A given one of the instances of the proof of physical presence protocol comprises sending a challenge to one of the user devices 406 from which the request was received, and detecting a response to the challenge from at least one of one or more of the sensor devices of the sensor network 405-1 and the user device. Examples of such instances of the proof of physical presence protocol include the PoP2 examples described elsewhere herein, although the term "proof of physical presence protocol" as broadly used herein should not be construed as being limited to PoP2 or any particular examples thereof.

In other embodiments, the challenge can be sent to one or more other devices associated with the request, such as a given one of the sensor devices, or a nearby device that can be used to display, play or otherwise present information relating to the challenge. In these and other arrangements, the challenge is sent to at least one device associated with the request, and a response to the challenge is detected from that device or another device.

In some embodiments, the verifier 410 is further configured to initiate at least one instance of the proof of physical presence protocol with a responder that has provided a response to the one or more notifications, and to require successful completion of the at least one instance of the proof of physical presence protocol with the responder in order for the response provided by that responder to be considered in approving or rejecting the request. The responder can be, for example, a user associated with one of the user devices 406 that is in communication with the sensor network 405-1 and/or one or more of the communication networks 404.

A wide variety of alternative embodiments are possible, as will be readily appreciated by those skilled in the art.

For example, some embodiments provide a system for performing a PoP, such as a PoP3 instance comprising one or more PoP2 instances. The system includes one or more verifiers connected to a sensor device collection, wherein the verifier: generates a challenge; receives a first signal associated with the sensor device collection; determines whether the first signal corresponds to at least part of a valid response to the challenge; based on the outcome of the determination, transmits a notification message to at least one communication account; receives a second signal associated with the notification message; and based on the second signal, determines whether the PoP succeeds.

The first signal illustratively corresponds to at least one of a change in electric consumption, a sensor input and information transmitted over a wireless channel by a sensor device in the sensor device collection.

The second signal illustratively indicates at least one of a positive response, a negative response, and the absence of a response.

The notification message illustratively comprises at least one of an email message, an SMS message, a robocaller message; and information sent to an app over the Internet.

The second signal in some embodiments comprises at least one of a response to the notification message; a request of a webpage associated with the notification message; a voice command or key input in response to a robocaller message; and a web request generated by the app.

The challenge in some embodiments comprises at least one of an unpredictable value, an unpredictable time interval during which an action has to be taken, and an indication of an action that has to be taken, where the action is selected in an unpredictable manner from a set of available actions.

Another illustrative embodiment includes a system for performing a PoP, such as a PoP3 instance comprising one or more PoP2 instances. The system comprises a verifier, at least one sensor device, a personal computing device, and a network that connects the verifier, the at least one sensor device and the personal computing device. The verifier generates a challenge and transmits a description of the challenge to at least one of the personal computing device and the at least one sensor device. At least one of the personal computing device and the at least one sensor device generates a first signal associated with the description of the challenge. The verifier receives the first signal, and in response to receiving the first signal, generates a notification message, and the verifier receives a second signal in response to the notification message. A determination is made based at least in part on the first signal and the second signal, and the PoP is accepted conditional on the determination.

The particular features and other advantages described herein are examples presented in the context of illustrative embodiments, and therefore such features and advantages need not be present in other embodiments. Such features and advantages of illustrative embodiments should not be viewed as limiting in any way.

For example, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

Also, references herein to particular features or other aspects as being "optional" refer to utilization in one or more particular embodiments, and should not be construed as an indication that any other features or aspects, such as features or aspects not explicitly referred to as optional, are required in any particular embodiments.

Illustrative embodiments disclosed herein include systems, methods, apparatus and computer program products comprising non-transitory storage media storing program code.

The above-described systems and other processing entities described herein may be part of an information processing system, such as the information processing system 400 described in conjunction with FIG. 4. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

An example of such a processing device is the processing device that implements the verifier 410 of the central authority 402 in system 400. That particular processing device includes processor 415 coupled to memory 416 and network interface 418.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network such as a Bluetooth, NFC, WiFi or WiMAX network, or various portions or combinations of these and other types of networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of systems as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another. The ordering of such process steps can also be varied relative to their ordering in illustrative embodiments.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative access rights management related contexts. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
   at least one processing device comprising a processor coupled to a memory;
   said at least one processing device being configured:
   to receive from a requester a request to modify a parameter of an access-controlled account associated with a set of sensor devices;
   responsive to receipt of the request, to initiate one or more instances of a proof of physical presence protocol, each of the one or more instances of the proof of physical presence protocol requiring performance by the requester of at least one action involving at least one sensor device of the set of sensor devices associated with the access-controlled account, the at least one action required to be performed by the requester in a given one of the one or more instances of the proof of physical presence protocol requiring the requester to be physically present at a location of the at least one sensor device;
   responsive to successful completion of at least one of the one or more instances of the proof of physical presence protocol, to send at least one notification to each of one or more registered users of the access-controlled account; and
   to approve or reject the request based at least in part on at least one of a number and a type of responses to the one or more notifications;
   wherein at least one of a number and a type of the one or more instances of the proof of physical presence protocol is selected based at least in part on comparison of a location of the requester relative to the location of the at least one sensor device.

2. The apparatus of claim 1 wherein said at least one processing device implements a verifier entity of a central authority coupled to a sensor network comprising the set of sensor devices.

3. The apparatus of claim 1 wherein the set of sensor devices comprises one or more sensor devices deployed within at least one of an interior space and an exterior space associated with a residence or business.

4. The apparatus of claim 1 wherein the at least one action required to be performed by the requester in the given instance of the proof of physical presence protocol comprises executing a specified type of detectable interaction with the at least one sensor device.

5. The apparatus of claim 1 wherein a first one of the one or more instances of the proof of physical presence protocol is performed and if successfully completed the one or more notifications are sent.

6. The apparatus of claim 5 wherein responsive to the request not being approved based on responses to the one or more notifications sent after the successful completion of the first instance of the proof of physical presence protocol, one or more additional instances of the proof of physical presence protocol are initiated, wherein each of the first and additional instances requires performance, by the requester, of a different action involving at least one sensor device of the set of sensor devices associated with the access-controlled account, and wherein one or more additional notifications are sent responsive to successful completion of each of the one or more additional instances of the proof of physical presence protocol.

7. The apparatus of claim 1 wherein said at least one processing device is further configured to classify each of the responses to the one or more notifications into a plurality of different response types including:
(i) a negative response;
(ii) a positive response; and
(iii) an absence of an expected response.

8. The apparatus of claim 7 wherein a number of additional instances of the proof of physical presence protocol that must be successfully completed in order to obtain approval of the request is increased responsive to at least one of a negative response and an absence of an expected response to the one or more notifications.

9. The apparatus of claim 8 wherein an amount of the increase in the number of additional instances of the proof of physical presence protocol is relatively high for a negative response and relatively low for an absence of an expected response.

10. The apparatus of claim 1 wherein at least one of a negative response and an absence of an expected response to the one or more notifications causes at least one additional instance of the proof of physical presence protocol to be initiated.

11. The apparatus of claim 1 wherein the given instance of the proof of physical presence protocol comprises:
sending a challenge to at least one device associated with the request; and
detecting a response to the challenge from at least one device associated with the request;
wherein the device to which the challenge is sent and the device from which the response is detected comprise a same device or different devices.

12. The apparatus of claim 1 wherein said at least one processing device is further configured:
to initiate at least one of the one or more instances of the proof of physical presence protocol with a responder that has provided a response to the one or more notifications; and
to require successful completion of the at least one instance of the proof of physical presence protocol with the responder in order for the response provided by that responder to be considered in approving or rejecting the request.

13. The apparatus of claim 1 wherein initiating the one or more instances of the proof of physical presence protocol comprises initiating respective instances of the proof of physical presence protocol in each of a plurality of iterations, wherein the one or more notifications are sent responsive to successful completion of the proof of physical presence protocol in each of the iterations.

14. The apparatus of claim 1 wherein approving or rejecting the request based at least in part on at least one of a number and a type of responses to the one or more notifications comprises:
aggregating numbers of responses for each of a plurality of different response types over multiple iterations wherein for each of the multiple iterations a corresponding one of the one or more instances of the proof of physical presence protocol is initiated and if successfully completed the one or more notifications are sent; and
approving or rejecting the request based at least in part on the aggregated numbers of responses.

15. A method comprising:
receiving from a requester a request to modify a parameter of an access-controlled account associated with a set of sensor devices;
responsive to receipt of the request, initiating one or more instances of a proof of physical presence protocol, each of the one or more instances of the proof of physical presence protocol requiring performance by the requester of at least one action involving at least one sensor device of the set of sensor devices associated with the access-controlled account, the at least one action required to be performed by the requester in a given one of the one or more instances of the proof of physical presence protocol requiring the requester to be physically present at a location of the at least one sensor device;
responsive to successful completion of at least one of the one or more instances of the proof of physical presence protocol, sending at least one notification to each of one or more registered users of the access-controlled account; and
approving or rejecting the request based at least in part on at least one of a number and a type of responses to the one or more notifications;
wherein at least one of a number and a type of the one or more instances of the proof of physical presence protocol is selected based at least in part on comparison of a location of the requester relative to the location of the at least one sensor device; and
wherein the method is performed by at least one processing device comprising a processor coupled to a memory.

16. The method of claim 15 wherein initiating the one or more instances of the proof of physical presence protocol comprises initiating respective instances of the proof of physical presence protocol in each of a plurality of iterations, wherein the one or more notifications are sent responsive to successful completion of the proof of physical presence protocol in each of the iterations.

17. The method of claim 15 wherein approving or rejecting the request based at least in part on at least one of a number and a type of responses to the one or more notifications comprises:
aggregating numbers of responses for each of a plurality of different response types over multiple iterations wherein for each of the multiple iterations a corresponding one of the one or more instances of the proof of physical presence protocol is initiated and if successfully completed the one or more notifications are sent; and
approving or rejecting the request based at least in part on the aggregated numbers of responses.

18. A computer program product comprising a non-transitory processor-readable storage medium having stored therein program code of one or more software programs, wherein the program code when executed by at least one processing device causes said at least one processing device:
to receive from a requester a request to modify a parameter of an access-controlled account associated with a set of sensor devices;
responsive to receipt of the request, to initiate one or more instances of a proof of physical presence protocol, each of the one or more instances of the proof of physical presence protocol requiring performance by the requester of at least one action involving at least one sensor device of the set of sensor devices associated with the access-controlled account, the at least one action required to be performed by the requester in a given one of the one or more instances of the proof of physical presence protocol requiring the requester to be physically present at a location of the at least one sensor device;

responsive to successful completion of least one of the one or more instances of the proof of physical presence protocol, to send at least one notification to each of one or more registered users of the access-controlled account; and to approve or reject the request based at least in part on at least one of a number and a type of responses to the one or more notifications;

wherein at least one of a number and a type of the one or more instances of the proof of physical presence protocol is selected based at least in part on comparison of a location of the requester relative to the location of the at least one sensor device.

19. The computer program product of claim 18 wherein initiating the one or more instances of the proof of physical presence protocol comprises initiating respective instances of the proof of physical presence protocol in each of a plurality of iterations, wherein the one or more notifications are sent responsive to successful completion of the proof of physical presence protocol in each of the iterations.

20. The computer program product of claim 18 wherein approving or rejecting the request based at least in part on at least one of a number and a type of responses to the one or more notifications comprises:

aggregating numbers of responses for each of a plurality of different response types over multiple iterations wherein for each of the multiple iterations a corresponding one of the one or more instances of the proof of physical presence protocol is initiated and if successfully completed the one or more notifications are sent; and approving or rejecting the request based at least in part on the aggregated numbers of responses.

* * * * *